Inventor
Chester S. Jennings

Patented May 1, 1928.

1,668,529

UNITED STATES PATENT OFFICE.

CHESTER S. JENNINGS, OF SYRACUSE, NEW YORK, ASSIGNOR TO THE LAMSON COMPANY, OF SYRACUSE, NEW YORK, A CORPORATION OF MASSACHUSETTS.

CARRIER-DISPATCH SYSTEM.

Application filed April 24, 1926. Serial No. 104,359.

This invention relates to carrier systems and the like, and more especially to systems for selectively and automatically diverting and distributing carriers from a common path into a plurality of terminal stations and dividing them evenly between said terminal stations so that each station receives a carrier in turn. This invention is an improvement on the device shown in the application of William J. Hepperle Serial No. 96,985 filed March 24, 1926, for diverting and distributing mechanism for carrier systems.

The invention comprehends in general an apparatus for the delivery of carriers coming from various points and in more or less variable numbers to a common conveyor, and for selectively diverting and distributing said carriers from the conveyor among two or more different terminal stations, so that each station receives a carrier in turn. A separate and independent system may be employed for returning the carriers to their respective points of origin.

One purpose, for which the invention is especially appropriate consists in the delivery of cash carriers from the salespeople in the various departments of a retail store to the cashiers, for making change, recording sales and the like, the carrier being then returned to the salesperson from whom it was received. In such systems, where a number of cashiers are required, it becomes essential that the carriers be apportioned among them equally and as rapidly as possible, that is without oversupplying some with more carriers than others.

It is also the object of the invention to provide a means by which all of the carriers may be diverted past any one receiving station if the cashier at that station is not present and also a system whereby all of the carriers may be diverted to any one station.

A typical embodiment of the invention as arranged and adapted to serve this purpose, is shown by the accompanying drawings, in which.

Figure 1:
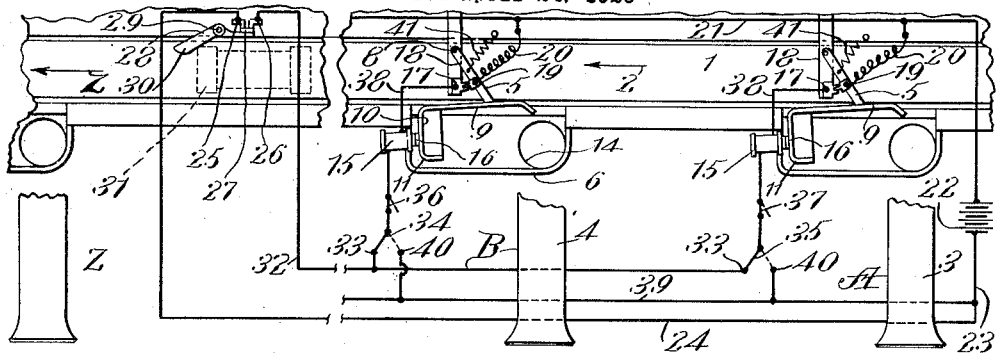
Fig. 1 is a more or less diagrammatic plan view showing a distributing system embodying the invention.

Referring to Fig. 1 there is diagrammatically illustrated a portion of a distributing system of which the present invention forms a principal part. The horizontal conveyor 1 traveling in the direction of the arrow 2 is adapted to receive the carriers from the various tubes leading from the sending stations at different parts of the store in which the system is located. The tubes and the place where they deposit the carriers on the belt 1 are not shown as they form no part of the present invention. Beyond the openings of the discharge tubes and located alongside the conveyor are provided distributing stations A, B, etc. it is understood that there are as many of these stations connected in a similar way as desired in the system and that any carriers which are not collected and diverted into one of these devices as A and B are finally conveyed to a terminal station Z. The distributor stations A, B, etc. are provided with tubes 3 and 4 respectively leading to the cashiers' desks in the well-known manner.

As the various diverting devices are identical only one will be described, it being understood that the other stations are provided with exactly the same type of diverting devices. Each device comprises generally a horizontal diverting arm 5 pivoted to swing over the conveyor belt 1 and adapted to catch a carrier moving thereon and to swing into a receiving chamber 6 which in turn opens into a vertical or other suitably disposed conduit 7 similar to conduits 3 and 4 at stations A and B which in these diagrammatic showings has a part shown in plan and a part in elevation.

The arm 5 is pivoted at 8 so that it swings at a sufficient height above the conveyor belt 1 to permit carriers to pass thereunder when in open position as shown at stations A and B. Affixed to the outer end of arm 5 is a depending deflector plate 9 disposed at such angle thereto as to stand transversely across the path of the carriers on the conveyor belt 1 when in closed position as shown at the left hand station Z' on Fig. 2, and to stand parallel with and beyond such path when the arm is swung into open position as shown at station B' on Fig. 2. The rearward end of deflector plate 9 is bent outwardly as at 10 and again at 11, substantially into parallelism with plate 9 and forming a recess or pocket 12 therein. A shelf-like projection 13 extends from the lower end of the deflector plate, forming a bottom to the pocket 12 at a level slightly above that of the conveyor belt 1.

The receiving chamber 6 opens out of the path of the conveyor belt at a point opposite the arm 5 and is of sufficient size to receive the deflector plate, with a carrier in the pocket 12 thereof. The chamber 6 is preferably provided with a sloping bottom terminating in an opening 14 leading to the vertical conduit 7, which is of such diameter as to receive a carrier longitudinally therein and has a terminal opening at the bottom thereof. A solenoid 15 is provided in the rear wall of chamber 6. This solenoid, when energized, is adapted to attract and hold a button 16 of magnetic material which is affixed to the rear portion 10 of the deflector element.

Each solenoid 15 is connected by a wire 38 to a stationary contact element 17 conveniently affixed to the bracket 18 to which the arm 5 is pivoted. A movable contact element 19 is suitably affixed to arm 5 and adapted to engage contact element 17 when the deflector element is in closed position as shown on Fig. 1. The contact element 19 is connected by a flexible wire 20 to a wire 21 leading to one terminal of a battery 22 or other suitable source of electric energy. Referring now to Fig. 1, the other terminal of the battery 22 is connected through wires 23 and 24 to a contact element 25 adjacent to the conveyor 1 at a point immediately preceding station Z. A similar contact element 26 is provided adjacent to the element 25 but spaced therefrom. A bridge piece 27 is adapted in one position to make contact between elements 25 and 26. The bridge piece 27 is affixed to one end of a bell crank lever 28 which is pivoted to the frame of the device at 29. The other arm 30 of the bell crank lever is adapted to be engaged by a carrier 31 shown in dotted lines on Fig. 1 so that when the carrier strikes the arm 30 of the bell crank lever, it is rotated about its pivot 29 and the bridge piece 27 is moved out of contact with elements 25 and 26 thereby breaking the circuit. The contact element 26 is connected by a wire 32 to one point 33 of each of the two point switches 34 and 35 of stations B and A respectively and similarly any other station except the last station Z of the system. These switches are adapted normally to have the switch lever in a position contacting with point 33. The levers of switches 34 and 35 are connected through the normally closed manually operable switches 36 and 37 respectively to the solenoids 15 of stations B and A respectively.

Therefore with the parts in the position shown in Fig. 1 a circuit in station A is completed as follows: battery 22, wires 23 and 24, contact 25, bridge piece 27, contact 26, wire 32, point 33, switch 35, switch 37, solenoid 15, wire 38, contact 17, contact 19, wire 20, and wire 21 to the battery.

A wire 39 is connected to one point of the battery through wire 23 and is connected to the other point 40 of switches 34 and 35 respectively. It is understood that wire 39 is similarly connected to a similar point of each of the switches corresponding to switches 34 and 35 at any other stations when more stations are used.

The operation of the device is as follows: Assuming that the switches are all in the full line positions shown on Fig. 1 and the deflecting elements are all in open position with the deflector members 9 extending across the belt; a carrier being conveyed along on the belt will strike the deflector element 9 of station A and will turn it to the position shown on Fig. 1 where the element 16 will be in contact with the solenoid 15 and where contact will be made between elements 17 and 19. The carrier will then drop down tube 3. A circuit will be completed as described above, energizing the solenoid 15 of station A and retaining the deflector plate 9 of that station in the position shown in Fig. 1. The same action will happen at each successive station as one carrier is distributed to each station and will serve to hold the deflecting element of that station in inoperative position as long as the solenoid thereof is energized. When the last regular station similar to stations A and B has been supplied in its turn, the next carrier 31 will contact with the arm 30, breaking the circuit to each and all of the solenoids between points 25 and 26 thereby allowing the arms 5 and deflecting elements 9 to swing back into operative position due to the action of spring 41. The cycle will then be repeated, the above being the normal operation.

However, if, for example, the cashier at station B was called elsewhere, she would throw the switch 34 to the other position in which the arm would lie in the dotted line position shown in the various figures making contact with point 40. A circuit would then be completed as follows: battery 22, wires 23 and 39, point 40, switch 34, switch 36, solenoid 15, wire 38, contact elements 17 and 19 and wires 20 and 21 to the battery. In this way the solenoid would be energized and would retain the deflector plate 9 in inoperative position irrespective of the carriers going by or the breaking of the circuit at 25 and 26. It is obvious that any one or more of the stations may be rendered inoperative in this way.

If several of the operators were absent and the operator at any one station as station B wishes to take all of the carriers, the switch 36 at the latter station may be opened as shown in dotted lines. This will break all possible circuits to the solenoid 15 of that station and allow the deflector 9 to be returned to operative position by the action of spring 41 as soon as each carrier is deposited in the receiving chamber 6. In this event also there will be no action causing the breaking of the contacts at 25, 26 and 27 whereby all of the stations except station B will be maintained in inoperative position.

Figure 2:
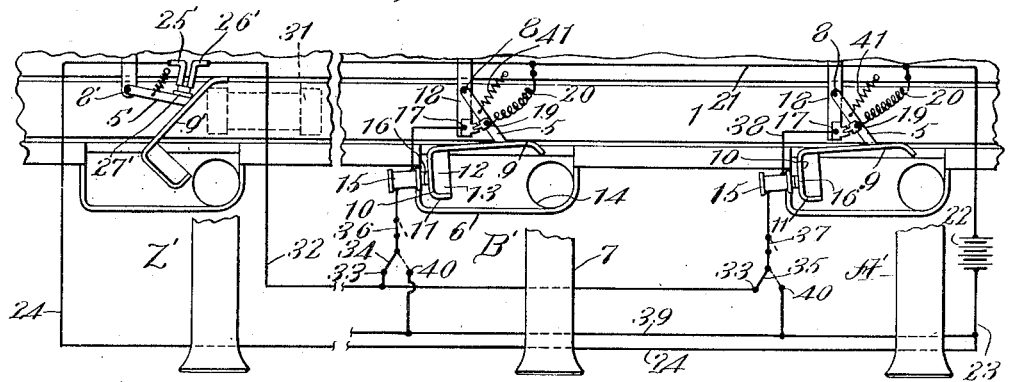
Fig. 2 is a similar view showing a modified form of the distributing system.

Fig. 2 shows a modified form of release on the last station Z'. This consists of a deflecting member 9' similar to members 9 previously described and swinging on an arm 5' pivoted at 8' to a bracket affixed to the device in any suitable way. Wires 24 and 32 are connected to contact members 25' and 26' respectively and a bridge piece 27' is carried by arm 5' so that when the deflecting member 9' is turned to a position parallel to the belt 1 by a carrier being directed against it the contact is broken and the circuits to the various solenoids are broken as in the modification shown in Fig. 1.

Figure 3:
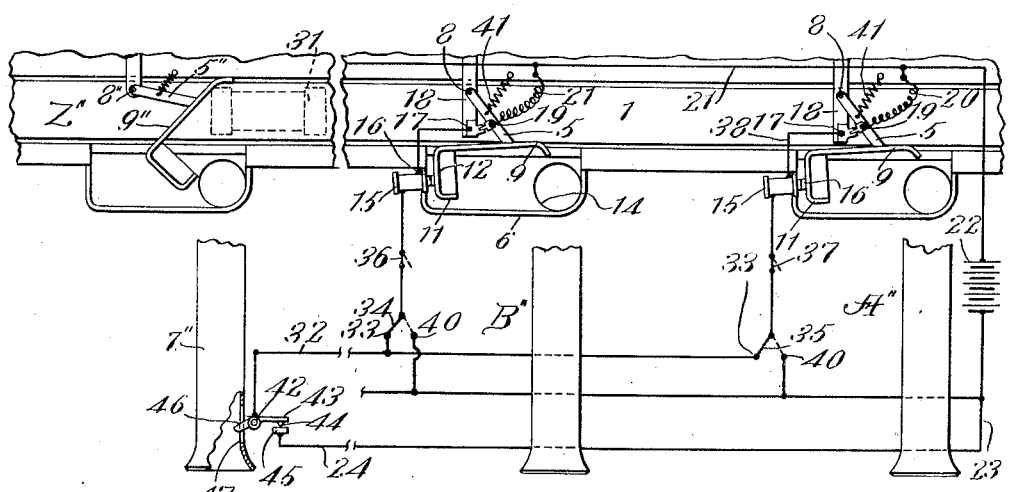
Fig. 3 is a similar view showing a further modification.

Fig. 3 shows a still further modification of the release switch for the various solenoids 15. The switch in this modification is independent of the deflecting member 9" of station Z" and is located in the lower portion of the tube 7" of that station to be actuated by a carrier passing down this tube. This switch consists of a bell crank lever 42 which is connected to wire 32 in any suitable manner and has one arm 43 provided with a contact point 44 adapted to engage a contact 45 to which wire 24 is affixed. The other arm 46 of the bell crank 42 extends through a slot 27 in the side of the tube 7" and is adapted to be engaged by a carrier passing down the tube to break the circuit.

It will be seen from the preceding description that I have provided a very simple device which will definitely accomplish the results desired, that is of evenly distributing the carriers among several receiving stations, allowing any one or more stations to be cut out at will and allowing any one station to be set to receive all the carriers. I do not wish therefore to be limited to the specific embodiments of the invention here shown and described but merely by the scope of the appended claims.

I claim:

1. A carrier system, comprising a conveyor, a plurality of stations along the path of said conveyor, a deflector element for each station adapted normally to engage and divert carriers from said conveyor to said station, and means controlling the action of the deflector elements to deliver a carrier to each of said stations in turn, independent of the number of stations at any moment employed.

2. A carrier system, comprising a conveyor, a plurality of stations along the path of said conveyor, a movable deflector for each station normally disposed transversely of said path, each deflector being movable by impact of a carrier to swing from said path and thereby divert the impacting carrier into the corresponding station, and retaining means for independently holding any selected deflector in inoperative position whereby to cause carriers to pass the corresponding station without entering it.

3. A carrier system, comprising a conveyor, a plurality of stations along the path of said conveyor, a deflector element for each station adapted normally to engage and divert a carrier from said conveyor to said station, and automatic means rendering each deflector temporarily inoperative after delivering one carrier to its corresponding station and rendering the same operative upon the reception of a carrier in a predetermined station subsequent thereto.

4. A carrier system, comprising a conveyor, a plurality of stations along the path of said conveyor, a deflector element for each station adapted normally to engage and divert carriers from said conveyor to said station, and means actuated by the diverted carrier controlling the action of the deflectors whereby normally to deliver a carrier to each station in turn or optionally to cause all carriers to pass any selected station.

5. A carrier system, comprising a conveyor, a plurality of stations along the path of said conveyor, a deflector element for each station adapted normally to engage and divert carriers from said conveyor to said station, means actuated by the diverted carrier controlling the action of the succeeding deflectors whereby normally to deliver a carrier to each station in regular turn, or optionally to cause all carriers to enter any selected station.

6. A carrier system, comprising a conveyor, a plurality of stations along the path of said conveyor, a deflector at each station, each deflector normally extending transversely of the carrier path and swinging from said path by impact of a carrier to divert said carrier from said conveyor path to said station, and automatic means controlling the action of each deflector adapted to cause said deflector temporarily to remain idle after each actuation thereby to permit carriers to pass such station without entering it.

7. A carrier system, comprising a conveyor, a plurality of stations along the path of said conveyor, a deflector element for each station adapted normally to engage and divert carriers from said conveyor to said station, and means controlling the deflectors severally actuated by said diverted carriers whereby normally to cause them to deliver a carrier to each station in turn, said controlling means comprising manually actuable devices for selectively causing all carriers to pass any given station or optionally to enter any given station.

8. A carrier system, comprising a conveyor, a plurality of carrier receiving chambers, each chamber opening into the path of travel of said conveyor, a pivoted deflector plate normally standing in and transversely of said path and adapted to receive the carrier and to swing in the direction of travel of said conveyor into the receiving chamber, a conduit leading from each receiving chamber, a solenoid in each chamber positioned to register with the deflector plate to retain the same in inoperative position when the solenoid is energized, and an electric circuit for each solenoid including a stationary contact element and a contact element movable with the corresponding deflector plate cooperating with the stationary contact element and making contact when said plate is in inoperative position, said circuit also including a switch common to all of the solenoids which is opened when a carrier is delivered to the last station in the line of travel.

9. A carrier system comprising a horizontal conveyor, a plurality of carrier receiving chambers, each chamber opening into the path of travel of said conveyor, a pivoted deflector plate normally standing in and transversely of said path and adapted to receive the carrier and to swing in the direction of travel of said conveyor into the receiving chamber, a conduit leading from each receiving chamber, a solenoid in each receiving chamber positioned to register with the deflector plate to retain the same in inoperative position when the solenoid is energized, an electric circuit for energizing each solenoid and a second circuit for each solenoid having a normally open manually operable switch therein whereby the deflector element is retained in inoperative position when said switch is closed.

10. A carrier system comprising a conveyor, a plurality of carrier receiving chambers, each chamber opening into the path of travel of said conveyor, a pivoted deflector plate normally standing in and obliquely to said path and adapted to receive the carrier and to swing in the direction of travel of said conveyor into the receiving chamber, a conduit connection leading from each receiving chamber, a solenoid in each receiving chamber positioned to register with the deflector plate to retain the same in inoperative position when the solenoid is energized, and an electric circuit for energizing each solenoid having a normally closed manually operable switch therein whereby when said switch is open the deflector element is immediately returned to operative position after each carrier is diverted from its normal path at the corresponding station.

11. A carrier system comprising a conveyor, a plurality of carrier receiving chambers, each chamber opening into the path of travel of said conveyor, a pivoted deflector plate normally standing in and obliquely to said path and adapted to receive the carrier and to swing in the direction of travel of said conveyor into the receiving chamber, a conduit leading from each receiving chamber, a solenoid in each receiving chamber positioned to register with the deflector plate to retain the same in inoperative position when the solenoid is energized, and an electric circuit for energizing each solenoid including a stationary contact element and a contact element movable with the corresponding deflector plate cooperating with the stationery contact element and making contact when said plate is in inoperative position, said circuit also including a switch common to all the solenoids which is opened when a carrier is delivered to the last station in the line of travel and a separate circuit for each solenoid having therein a manually operable switch for energizing it independently of the contacts first described.

12. A carrier system comprising a conveyor, a plurality of carrier receiving chambers, each chamber opening into the path of travel of said conveyor, a pivoted deflector plate normally standing in and obliquely to said path and adapted to receive the carrier and to swing in the direction of travel of said conveyor into the receiving chamber, a conduit leading from each receiving chamber, a solenoid in each receiving chamber positioned to register with the deflector plate to retain the same in inoperative position when the solenoid is energized, and an electric circuit for energizing each solenoid including a stationary contact element and a contact element movable with the corresponding deflector plate and cooperating with the stationary contact element and making contact therewith when said plate is in inoperative position, said circuit also including a switch common to all of the solenoids which is opened when a carrier is delivered to the last station in the line of travel, and a manually operable switch in the circuit of each solenoid for opening the circuit of said solenoid.

13. A carrier system comprising a conveyor and a plurality of carrier receiving chambers, each chamber opening into the path of travel of said conveyor, a pivoted deflector plate normally standing in and transversely of said path and adapted to receive the carrier and to swing in the direction of travel of said conveyor into the receiving chamber, a solenoid in each receiving chamber positioned to register with the deflector plate to retain the same in inoperative position when the solenoid is energized, and an electric circuit for energizing each solenoid having a normally closed manually operable switch therein and a separate circuit for each solenoid having a normally open manually operable switch therein whereby each solenoid may be maintained energized or de-energized as long as desired.

14. A carrier system comprising a conveyor, a plurality of carrier receiving chambers, each chamber opening into the path of travel of said conveyor, a pivoted deflector plate normally standing in and transversely of said path and adapted to receive the carrier and to swing in the direction of travel of said conveyor into the receiving chamber, a solenoid in each receiving chamber positioned to register with the deflector plate to retain the same in inoperative position when the solenoid is energized, and an electric circuit for energizing each solenoid including a stationary contact element and a contact element movable with the corresponding deflector plate, cooperating with the stationary contact element and making contact with said plate when the latter is in inoperative position, said circuit also including a switch common to all of the solenoids which is opened when a carrier is delivered to the last station in the line of travel, a manually operable switch in the circuit of each solenoid for opening the circuit of said solenoid, and a separate circuit for each solenoid having therein a manually operable switch for energizing it independently of the contacts first described.

15. A carrier system comprising a conveyor for moving carriers in a predetermined path, a plurality of carrier receiving chambers, a movable deflector normally disposed transversely of said carrier path and movable by impact of a carrier therewith to swing out of said path and thereby to move the impacting carrier into the corresponding chamber, a solenoid for retaining each deflector in inoperative position when the corresponding solenoid is energized, and an electric circuit for each solenoid.

16. A carrier system comprising a conveyor for moving carriers in a predetermined path, a plurality of stations disposed in spaced relation along said conveyor, a movable deflector corresponding to each station, each deflector normally extending transversely of the carrier path, each deflector being movable by impact of a carrier therewith from its normal position to an inoperative position out of the carrier path and by such movement diverting the impacting carrier into the corresponding station, a solenoid engageable with each deflector when such deflector is in inoperative position for temporarily retaining it in such position, and means actuable by movement of the deflector from operative to inoperative position to complete an electrical circuit through the corresponding solenoid.

17. A carrier system comprising a conveyor and a plurality of carrier receiving chambers, each chamber opening into the path of travel of carriers moving with said conveyor, a pivoted deflector normally disposed transversely of said path and adapted to receive a carrier and to swing by impact of such carrier out of the carrier path and into the corresponding receiving chamber, and means actuated by such movement of the deflector for temporarily retaining it in inoperative position.

18. A carrier system comprising a conveyor for moving carriers in a predetermined path, a plurality of stations spaced along said path, a deflector corresponding to each station, each deflector normally extending tranversely of said path, each deflector being movable by impact of a carrier therewith from its normal position to an inoperative position out of the carrier path and by such movement carrying the impacting carrier into the corresponding station, electromagnetic means for retaining each deflector in its inoperative position, and circuit closing means actuable by each deflector as it moves from operative to inoperative position to energize the corresponding electromagnetic retaining means.

Signed by me at Syracuse, New York, this twenty-first day of April, 1926.

CHESTER S. JENNINGS.